United States Patent [19]

West

[11] Patent Number: 5,364,170

[45] Date of Patent: Nov. 15, 1994

[54] SEAT BELT WEBBING GUIDE

[75] Inventor: Gary L. West, Romulus, Mich.

[73] Assignee: Hoover Universal, Inc., Plymouth, Mich.

[21] Appl. No.: 8,479

[22] Filed: Jan. 25, 1993

[51] Int. Cl.$^5$ .............................................. B60R 22/00
[52] U.S. Cl. ..................................... 297/483; 297/464
[58] Field of Search .............. 280/801 R, 801 A, 808; 297/483, 468, 473, 484, 486, 464, 469–472, 474–482

[56] References Cited

U.S. PATENT DOCUMENTS

| | | | |
|---|---|---|---|
| 3,414,322 | 12/1968 | Linderoth | 297/483 X |
| 3,431,019 | 3/1969 | Lewis et al. | 297/478 X |
| 3,471,197 | 10/1969 | Ely | 297/483 |
| 3,995,885 | 12/1976 | Plesmarski | 297/483 X |
| 4,549,749 | 10/1985 | Thomas | 297/483 X |
| 4,718,696 | 1/1988 | Korde et al. | 297/483 X |
| 5,088,794 | 2/1992 | Iwami et al. | 297/483 |

Primary Examiner—Kenneth J. Dorner
Assistant Examiner—Milton Nelson, Jr.
Attorney, Agent, or Firm—Harness, Dickey & Pierce

[57] ABSTRACT

A guide for a seat belt webbing is disclosed for use where the webbing is routed through an opening in a vehicle or body structure that is not a part of the seat belt system. The opening will typically be of a size large enough to permit passage of the seat belt anchors and other hardware during assembly of the vehicle or seat, The guide is installed in the opening after the larger hardware has been passed therethrough. The guide provides a small slot only large enough for the webbing itself to pass therethrough to prevent the webbing from being twisted or folded over into a double thickness and passed through the slot in the guide.

9 Claims, 1 Drawing Sheet

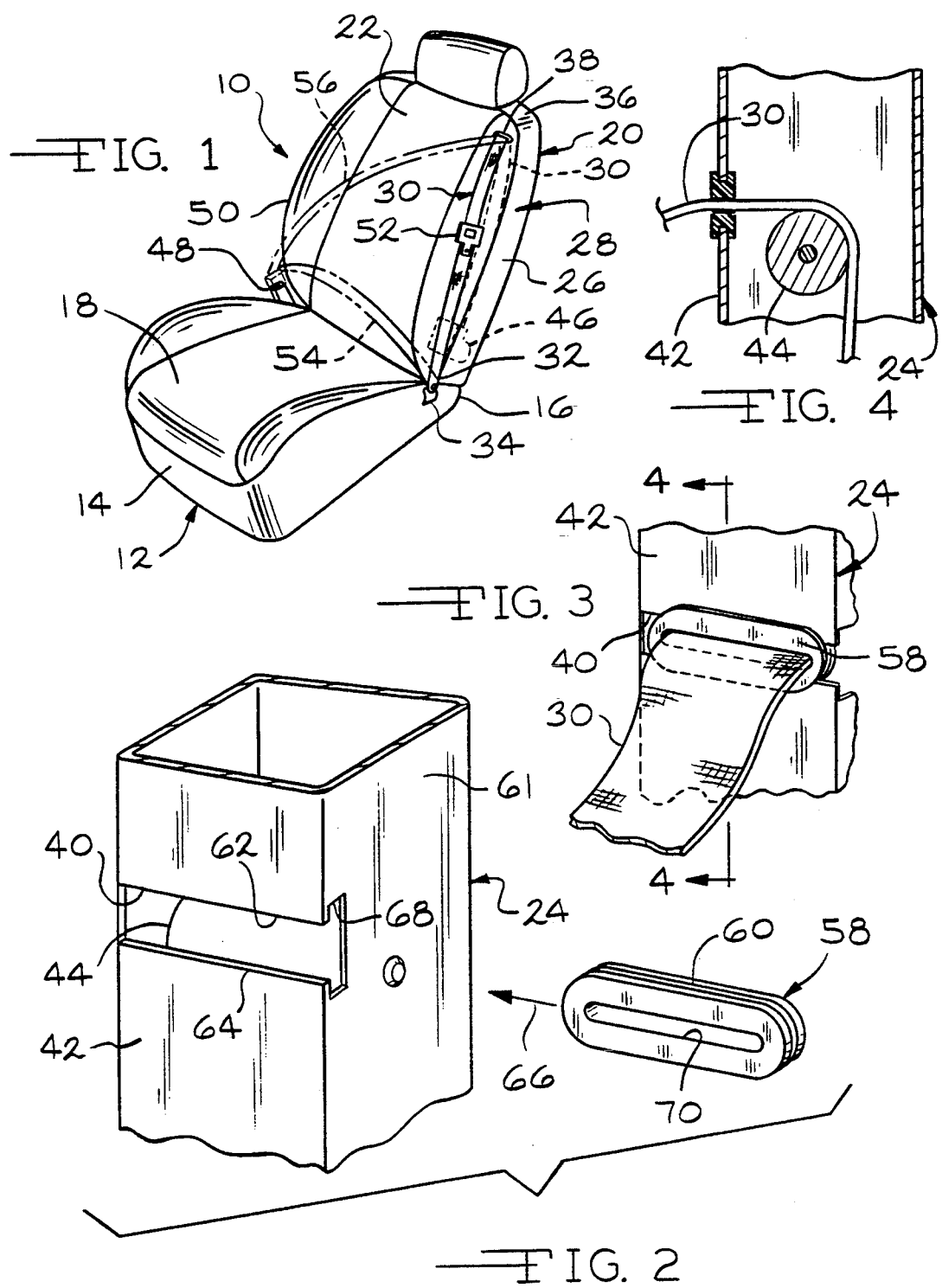

SEAT BELT WEBBING GUIDE

BACKGROUND AND SUMMARY OF THE INVENTION

The present invention relates to seat belt webbings and in particular to a guide for a seat belt webbing as the webbing passes through an opening in a vehicle structure.

Seat belts for vehicle seat assemblies include a belt webbing that is typically attached to the vehicle structure by an anchor bolt at one end and a webbing restraint at the other end. A clasp is mounted on the webbing for insertion into a buckle whereby the webbing forms a lap belt and a shoulder belt for a seat occupant. The webbing will generally be routed through a retractor housing and one or more "D" rings which are mounted to the vehicle structure. The seat belt system, including the retractor housing and "D" rings is assembled by the seat belt manufacturer and supplied as a unit to the vehicle manufacturer. During vehicle assembly, the seat belt system is simply attached to the vehicle at the belt anchor points.

However, in the case of a seat belt webbing mounted to a seat assembly instead of the vehicle structure, the webbing forming the shoulder belt may extend through an opening at the upper end of the seat back. To mount the seat belt system to a seat assembly, the belt webbing must be routed through the seat structure and the opening at the upper end of the seat back. This opening must be large enough to enable the belt anchor plate and clasp to pass through during routing of the belt as the seat is being assembled.

During use, as a seat occupant grasps the webbing to pull the webbing across his or her torso forming the lab belt and shoulder belt, the webbing is often pulled laterally relative to the opening in the seat back structure through which the webbing extends. This lateral pull on the webbing can cause the webbing to fold over on itself within the opening forming a double thickness of the webbing passing through the opening. In addition, twists of the webbing formed in the lap and shoulder belts can pass through the opening and into the seat back. The double thickness or twisting of the webbing can interfere with the extension and retraction of the webbing through the opening such that increased efforts are required to use the seat belt and can possibly render the seat belt unusable.

Accordingly, it is an object of the present invention to provide a structure to prevent the seat belt webbing from bunching or folding over in the opening into a seat back or other body structure through which a belt webbing its routed.

It is a further object of the present invention to provide a mechanism to prevent twists in a seat belt webbing from passing through an opening in the seat back or an opening in another body structure through which the belt webbing is routed.

It is a feature of the present invention to provide a guide for the webbing to be mounted in the opening in the structure for passage of the webbing therethrough. The guide contains a slot that is sized to closely fit around the webbing to prevent the webbing from folding over into a double thickness. The guide is sized so as to fit within the opening in the structure to fill the excess size of the opening after the attaching hardware has been passed through the opening during installation of the belt webbing to the seat assembly. The guide is placed on the belt webbing during the assembly of the seat belt system by the seat belt system manufacturer. Depending upon the particular design and the method of assembly, the guide itself may be sized so that it can fit through the opening in the vehicle structure in one orientation and then be reoriented for mounting into the opening for a permanent assembly.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a vehicle seat assembly including the seat belt webbing guide of the present invention;

FIG. 2 is a fragmentary perspective view of the seat belt webbing guide and the vehicle seat assembly mounting structure;

FIG. 3 is a perspective view showing the seat belt webbing extending through the guide; and FIG. 4 is a sectional view as seen from substantially the line 4—4 of FIG. 3.

DETAILED DESCRIPTION OF THE INVENTION

Seat assembly 10 shown in FIG. 1 has a seat belt system mounted thereto for restraining a seat occupant which utilizes the seat belt webbing guide of the present invention. The seat assembly 10 is of a conventional structure having a lower seat cushion 12 with front and rear ends 14 and 16 respectively and an upper seating surface 18. A seat back 20 extends generally upwardly at the rear end of the seat cushion and has a front surface 22 against which the torso of a seat occupant rests. Seat assembly 10 includes a seat frame in the cushion and seat back in a conventional manner. The seat frame includes an upright column member 24 extending upwardly in the seat back along one lateral side 26 of the seat assembly for supporting seat belt loads as described below.

The seat assembly 10 includes a passenger restraint system 28 for restraining an occupant in the seat assembly during a vehicle collision. The restraint system includes a seat belt webbing 30 used to form a lap belt and a shoulder belt for the seat occupant. The webbing 30 has a first end 32 that is attached to the seat frame adjacent the rear end of the seat cushion along one side 26 of the seat assembly. The webbing is attached to the frame through a mounting plate 34 and a seat belt anchor bolt (not shown) in a conventional manner for attaching a seat belt webbing to a vehicle structure. When the restraint system is not in use, the webbing 30 extends from the mounting plate 34 upwardly toward the top of the seat back, overlying the front surface 22 of the seat back adjacent the side 26 of the seat assembly.

Near the upper end 36 of the seat back, the webbing passes into the seat back through an opening 38 in the seat back upholstery cover. After passing into the seat back, the webbing 30 passes through an opening 40 in the front face or surface 42 of the upright column 24, see FIGS. 3 and 4. From the opening 40, the webbing passes over a cylindrical pulley or other curved supporting surface 44 and downward through the seat back to a seat belt webbing retractor 46 mounted to the seat frame. The retractor permits unwinding of the webbing from the retractor in the absence of deceleration of the seat assembly but locks automatically upon deceleration to prevent further unwinding of the seat belt webbing from the retractor. While the retractor 46 is shown at the lower end of the seat back, it can be attached to the seat frame at various vertical locations as desired.

A seat belt buckle 48 is attached to the seat assembly at the opposite lateral side 50 adjacent the rear of the seat cushion. The buckle 48 receives a clasp 52 that is slidably mounted to the seat belt webbing 30 between the mounting plate 34 and the location of the opening 38 where the webbing passes into the seat back. To use the restraint system, a seat occupant will grasp the clasp 52 and pull the clasp over their body to insert the clasp into the buckle 48. Doing so causes the webbing 30 to unwind from the retractor 46 as the webbing forms a lap belt 54 crossing the seat occupant's lap and a shoulder belt 56 extending diagonally across the torso of the seat occupant.

The restraint system 28 is typically supplied by its manufacture as a complete system consisting of the retractor 46, the webbing 30, the mounting plate 34 and the clasp 52. When the seat is assembled, the seat manufacture mounts the retractor 46 to the seat frame, routes the webbing 30 to the anchor point for the mounting plate 34 and attaches the mounting plate to the seat frame. The opening 40 in the upright column 38 and the opening in the upholstery cover must be large enough to enable the mounting plate 34 and the clasp 52 to pass through during assembly. As a result, these openings are significantly larger than the webbing 30 that extends through them.

During use of the restraint system, as the seat occupant pulls on the webbing 30, the webbing is pulled to the one side of the opening 40. In addition, during use, it is common for the webbing 30 to become twisted. The size of the opening 40 enables such a twist to pass through the opening 40. Once this occurs, it may be difficult or impossible to remove the twist from the seat back to enable the webbing to be untwisted. The twist in the belt webbing can interfere with proper functioning of the retractor such that the efforts required to pull the webbing from the retractor are increased. The twist can even jam the retractor making it unusable and hence, making the restraint system unusable.

The present invention seeks to overcome the problems of a twisted belt webbing by preventing any twist or folding of the webbing from passing into the seat back through the opening 40. The present invention consists of a guide 58 sized to fit within the opening 40 in the upright column. The top and bottom edges of the guide are formed with a groove 60 which enables the guide 58 to be inserted into the opening 40 from one side face 61 of the column 24 which has an opening 68 joining the opening 40. From the side face 61, the opening 40 presents a downwardly projecting top flange 62 and an upwardly projecting bottom flange 64. The guide 58 is inserted into the opening 40 by moving the guide in the direction of the arrow 66 so as to engage the flanges 62 and 64 in the groove 60 in the top and bottom edges of the guide 58.

The guide 58 is installed on the belt webbing 30 by the manufacturer of the restraint system and is supplied with the restraint system. As a result, the thickness of the guide 58 must be small enough so that the guide itself can pass through the opening 40 during routing of the seat belt webbing. After the guide is passed through the opening, it has been installed in the opening by movement in the direction of arrow 66. The opening 68 in the side face 60 of the upright column 24 is large enough to enable the guide 58 to be installed in the opening 40 while the webbing is extending through the guide.

The guide 58 includes an elongated slot 70 through the center of the guide that is sized and shaped to closely fit around the webbing to prevent folding of the webbing into a double thickness in the slot 70. As a result, when the webbing is pulled from the seat back, the webbing will remain in an unfolded condition and cannot be bunched at one end of the slot by pulling laterally on the webbing as it is extended. A twist in the webbing can not be passed through the slot 70 either.

The guide 58 is of a length less than the length of the opening 40 so that there is some lateral movement of the guide permitted in the opening. However, if this lateral movement of the guide is not desired, a snap lock feature can be provided on the guide to lock it in place once it is installed within the opening 40. A flexible finger extending from the guide 58 that engages the inner surface of the column side face 61 once the guide is installed will lock the guide in place.

The guide 58 can be most easily made of a molded thermal plastic resin, however, other materials could be used desired. In addition to preventing folding and twisting of the webbing, the guide has the advantage of providing a smooth, friendly surface for the webbing to pass over as it is extended and retracted into the seat back. This can reduce wear of the webbing as compared to the webbing passing over the metal edge of the opening 40.

While the guide is shown in conjunction with an opening in a seat back frame member, the guide can be used in any instance where the seat belt webbing passes through a opening in a fixed or stationary member that is not a part of the seat belt system. For example, the guide could be used for a webbing that extends from an opening in a vehicle body B-pillar if so desired. Furthermore, while the upright column 24 is shown as having a closed cross section, the guide is not limited to such structures but is rather intended for use where the seat belt webbing extends through a fixed opening.

The guide of the present invention for a seat belt webbing operates to prevent twisting, folding or buckling of the belt webbing as it passes through an opening in a vehicle structure. Such twisting or folding can interfere with the proper operation of the restraint system.

It is to be understood that the invention is not limited to the exact construction illustrated and described above, but that various changes and modifications may be made without departing from the spirit and scope of the invention as defined in the following claims.

I claim:

1. A passenger restraint system for attachment to a vehicle structure having an opening, said system comprising:

an elongated seat belt webbing having first and second ends;

first and second seat belt mounting structures attached to said first and second ends of said webbing respectively for mounting said webbing to the vehicle structure, said seat belt mounting structures being larger than said webbing;

a guide for said webbing, said guide having a one piece body having a slot for the seat belt webbing to pass through, said body being closely fitted to and completely surrounding said webbing passing through said slot to prevent folding of said belt webbing into a double thickness in said slot, said slot being smaller than said mounting structures whereby said webbing must be passed through said slot prior to attachment of one of said mounting structures to one of said webbing ends, said body having an external shape and size to fit within said opening in the vehicle structure; and means formed in said body for mounting said body in said opening with the seat belt webbing passing through said slot.

2. The restraint system of claim 1 wherein said opening is defined by top and bottom mounting flanges and wherein said means formed in said body for mounting said body in said opening comprises top and bottom laterally extending grooves in said body for reception of said top and bottom mounting flanges to mount said body into said opening.

3. The restraint system of claim 1 wherein said body has a thickness dimension less than a width dimension to enable said body to pass through said opening when said body is positioned to present said thickness dimension to said opening while said width dimension is sized to enable said body to be mounted into said opening.

4. A passenger restraint system for attachment to a vehicle structure having an opening, the opening being defined by a downward projecting top mounting flange and an upward projecting bottom mounting flange, said system comprising:

an elongated seat belt webbing having first and second end;

first and second seat belt mounting structures attached to said first and second ends of said webbing respectively for mounting said webbing to the vehicle structure, said seat belt mounting structures being larger than said webbing;

a guide for said webbing, said guide having a one piece body having a slot for the seat belt webbing to pass through, said body being closely fitted to and completely surrounding said webbing to prevent folding of said belt webbing into a double thickness in said slot, and said body having top and bottom laterally extending grooves for reception of said top and bottom mounting flanges to mount said body in the opening in the vehicle structure whereby said webbing passes through the opening.

5. The passenger restraint system of claim 4 having a length less than the length of the opening in the vehicle structure in which the guide is mounted whereby the top and bottom mounting flanges and the grooves in the guide body permit lateral movement of said guide relative to said vehicle structure.

6. A vehicle seat assembly having first and second laterally spaced sides comprising:

a lower seat cushion having front and rear ends and an upper seating surface;

a seat back extending generally upwardly from said seat cushion at the rear end thereof and having a front surface against which the torso of a seat occupant rests;

a seat frame within said seat cushion and said seat back including a generally upright column member within said seat back along said first side thereof;

restraint means attached to said seat frame for restraining a seat occupant in said seat assembly during a vehicle collision, said restraint means including a seat belt webbing having one end attached to said seat frame at the rear end of said seat cushion along said first side of said seat assembly by a seat belt anchor larger than said webbing, said belt webbing extending upwardly from said anchor toward the top of said seat back overlaying the front surface of said seat back, said webbing adjacent the upper end of said seat back extending into said seat back and through a front face of said upright column and extending downward to a seat belt webbing retractor mounted to said seat frame, said retractor allowing for unwinding of said webbing from said retractor in the absence of deceleration of said seat assembly;

a clasp slidably mounted to said belt webbing between said anchor and the location where said webbing extends into said seat back;

a seat belt buckle attached to the seat cushion at the rear end thereof on a second side of said seat assembly opposite said first side for reception of said clasp upon extension of said webbing from said retractor and seat back whereby said webbing extends across the lap of a seat occupant and diagonally across the torso of the seat occupant to form a lap belt and a shoulder belt for the seat occupant;

the front face of said upright column having an opening therethrough for said belt webbing to pass through; and a one piece guide member mounted in said opening having a slot for said webbing to pass through, said guide member being shaped to closely fit and to completely surround said webbing to prevent folding of said webbing into a double thickness in said slot, said slot being smaller than said anchor whereby said webbing must be passed through said prior attachment of one of said seat belt anchor and said retractor to said webbing.

7. The seat assembly of claim 6 further comprising means in said opening and said guide member for permitting lateral movement of said guide member within said opening relative to said upright column.

8. The seat assembly of claim 7 wherein said means for permitting lateral movement of said guide member in said opening includes a downwardly projecting flange forming the top of said opening and an upwardly projecting flange forming the bottom of said opening and said guide member having top and bottom laterally extending grooves for reception of said top and bottom flanges to permit lateral movement of said guide member.

9. The seat assembly of claim 8 wherein said upright column has two spaced side faces on opposite sides of said front face, one of said side faces including an opening joining the opening in said front face thereby exposing one end of said top and bottom flanges for mounting said guide member into said front face opening.

* * * * *

UNITED STATES PATENT AND TRADEMARK OFFICE
CERTIFICATE OF CORRECTION

PATENT NO. : 5,364,170

DATED : November 15, 1994

INVENTOR(S) : Gray L. West

It is certified that error appears in the above-indentified patent and that said Letters Patent is hereby corrected as shown below:

In Column 1, line 53, delete "its" and insert —is—.

In Column 4, line 26, after "used" insert —if—.

In Column 5, line 33, Claim 4, delete "end" and insert —ends—.

In Column 5, line 49, Claim 5, after "Claim 4", delete "having" and insert —wherein the guide has—.

In Column 6, line 41, Claim 6, after "through said", insert —guide member—.

In the Abstract, line 6, delete "," at the end of the line and insert —.—.

Signed and Sealed this

Twenty-first Day of February, 1995

Attest:

BRUCE LEHMAN

Attesting Officer    Commissioner of Patents and Trademarks